United States Patent
Lee et al.

(10) Patent No.: US 11,632,695 B2
(45) Date of Patent: Apr. 18, 2023

(54) EVOLVED PACKET SYSTEM (EPS) MOBILITY CONFIGURATION FROM WIRELESS SYSTEM

(71) Applicant: QUALCOMM Incorporated, San Diego, CA (US)

(72) Inventors: Soo Bum Lee, San Diego, CA (US); Adrian Edward Escott, Reading (GB); Cogol Tina, Mission Viejo, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/897,978

(22) Filed: Jun. 10, 2020

(65) Prior Publication Data

US 2020/0396647 A1  Dec. 17, 2020

Related U.S. Application Data

(60) Provisional application No. 62/860,109, filed on Jun. 11, 2019.

(51) Int. Cl.
*H04W 36/00* (2009.01)
*H04W 48/16* (2009.01)
(Continued)

(52) U.S. Cl.
CPC ........ *H04W 36/0022* (2013.01); *H04W 8/08* (2013.01); *H04W 36/0038* (2013.01);
(Continued)

(58) Field of Classification Search
None
See application file for complete search history.

(56) References Cited

U.S. PATENT DOCUMENTS

| 2019/0261136 | A1* | 8/2019 | Niemi | H04W 8/08 |
| 2019/0380068 | A1* | 12/2019 | Jost | H04W 12/041 |
| 2021/0168601 | A1* | 6/2021 | Ben Henda | H04W 8/08 |

OTHER PUBLICATIONS

International Search Report and Written Opinion—PCT/US2020/037272-13 ISA/EPO—dated Sep. 21, 2020.

(Continued)

*Primary Examiner* — German Viana Di Prisco
(74) *Attorney, Agent, or Firm* — Arent Fox LLP/Qualcomm Incorporated

(57) ABSTRACT

In an aspect, the present disclosure includes a method, apparatus, and computer readable medium for wireless communications for configuring of a NAS COUNT value of a mapped EPS security context associated with an intersystem change of a UE from a 5G system to an EPS. The aspect includes generating, by a UE, a mapped EPS security context associated with an intersystem change of the UE from a 5G system to an EPS, wherein the mapped EPS security context comprises security parameters created based a 5G security context used for the 5G system, the security parameters enabling security-related communications between the UE and a network entity; determining an UL NAS COUNT value and the DL NAS COUNT value for the mapped EPS security context; and transmitting, by the UE, a NAS message to the network entity, the NAS message including the UL NAS COUNT value of the mapped EPS security context.

50 Claims, 11 Drawing Sheets

(51) Int. Cl.
*H04W 76/25* (2018.01)
*H04W 8/08* (2009.01)
*H04W 36/32* (2009.01)

(52) U.S. Cl.
CPC .......... *H04W 36/32* (2013.01); *H04W 48/16* (2013.01); *H04W 76/25* (2018.02)

(56) References Cited

OTHER PUBLICATIONS

"3rd Generation Partnership Project; Technical Specification Group Services and System Aspects; Security architecture and procedures for 5G system (Release 15)", 3GPP Standard, Technical Specification, 3GPP TS 33.501, 3rd Generation Partnership Project (3GPP), Mobile Competence Centre, 650, Route Des Lucioles, F-06921, Sophia-Antipolis Cedex, France, vol. SA WG3, No. V15.4.0, Mar. 28, 2019 (Mar. 28, 2019), pp. 1-187, p. 104, paragraph 8.3—p. 107, paragraph 8.3.2 p. 110, paragraph 8.5—p. 112, paragraph 8.6.1.

Qualcomm Incorporated: "Issues of Resetting NAS Count Values in 5G to 4G mobility", 3GPP Draft, 3GPP TSG SA WG3 (Security) Meeting #96, S3-192940, 3rd Generation Partnership Project (3GPP), Mobile Competence Centre, 650, Route Des Lucioles, F-06921 Sophia-Antipolis Cedex, France, vol. SA WG3, No. Wroclaw (Poland), Aug. 26, 2019-Aug. 30, 2019, Aug. 19, 2019 (Aug. 19, 2019), XP051776773, 2 Pages, URL: http://www.3gpp.org/ftp/tsg_sa/WG3_Security/TSGS3_96_Wroclaw/Docs/S3-192940.zip, [retrieved on Aug. 19, 2019], the whole document.

Qualcomm Incorporated: "NAS Count Values in the Mapped EPS Security Context in 5GS to EPS change", 3GPP Draft, 3GPP TSG-SA WG3 Meeting #96, S3-192563, 3rd Generation Partnership Project (3GPP), Mobile Competence Centre, 650, Route Des Lucioles, F-06921 Sophia-Antipolis Cedex, France, vol. SA WG3, No. Wroclaw (Poland), Aug. 26, 2019-Aug. 30, 2019, Aug. 19, 2019 (Aug. 19, 2019), XP051776403, 3 pages, URL: http://www.3gpp.org/ftp/tsg_sa/WG3_Security/TSGS3_96_Wroclaw/Docs/S3-192563.zip, [retrieved on Aug. 19, 2019], the whole document.

* cited by examiner

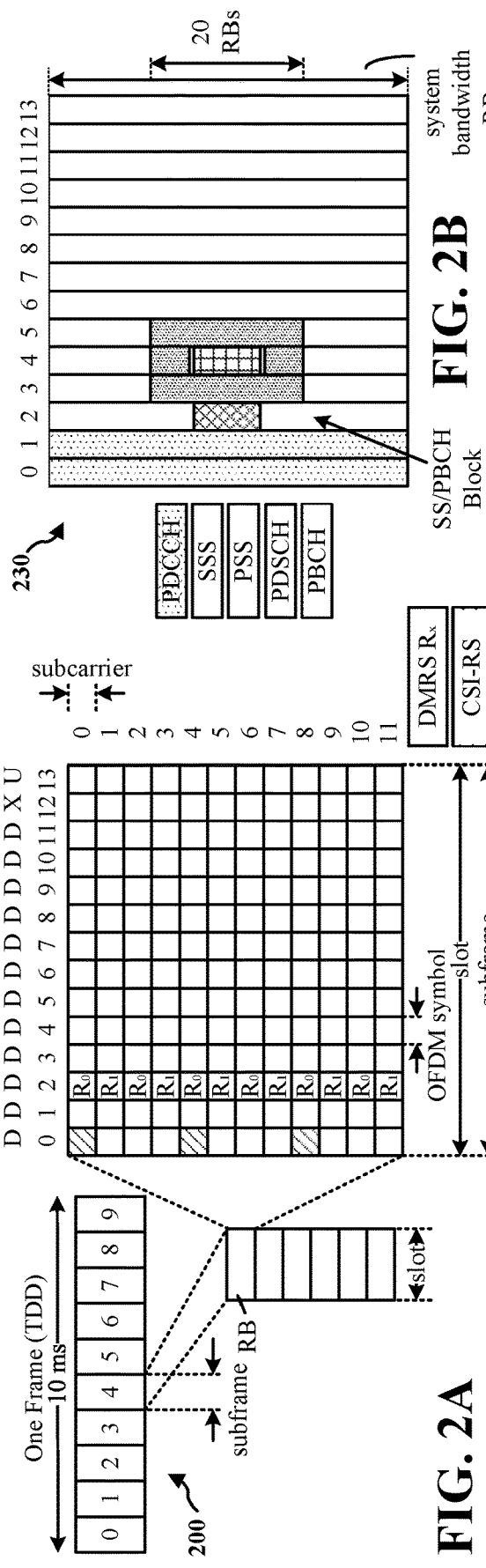
FIG. 2A
FIG. 2B
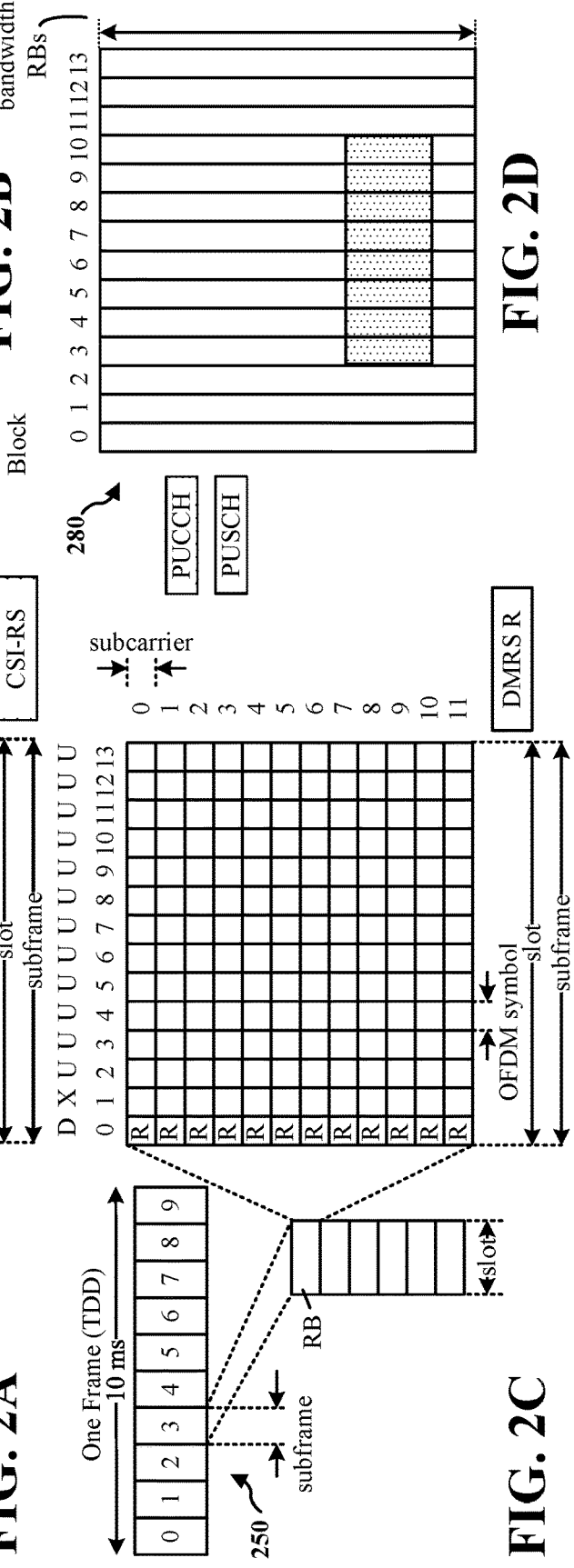
FIG. 2C
FIG. 2D

EVOLVED PACKET SYSTEM (EPS) MOBILITY CONFIGURATION FROM WIRELESS SYSTEM

CROSS-REFERENCE TO RELATED APPLICATION(S)

The present application claims benefit of U.S. Provisional Application No. 62/860,109 entitled "NAS COUNT CONFIGURATION FOR 5G SYSTEM TO EPS MOBILITY" filed Jun. 11, 2019, and is assigned to the assignee hereof and hereby expressly incorporated by reference herein.

BACKGROUND

Technical Field

The present disclosure relates generally to communication systems, and more particularly, to the configuration of a non-access stratum (NAS) COUNT value of a mapped Evolved Packet System (EPS) security context associated with an intersystem change of a user equipment (UE) from a wireless system to an EPS.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes generating, by a user equipment (UE), a mapped Evolved Packet System (EPS) security context associated with an intersystem change of the UE from a wireless system to an EPS, wherein the mapped EPS security context comprises security parameters created based on a security context used for the wireless system, the security parameters enabling security-related communications between the UE and a network entity; determining an uplink (UL) non-access stratum (NAS) COUNT value and a downlink (DL) NAS COUNT value for the mapped EPS security context; and transmitting, by the UE, a NAS message to the network entity, the NAS message including the UL NAS COUNT value of the mapped EPS security context.

In a further example, an apparatus for wireless communication is provided that includes a transceiver, a memory configured to store instructions, and one or more processors communicatively coupled with the transceiver and the memory. The aspect may include the one or more processors being configured execute instructions to generate, by a UE, a mapped EPS security context associated with an intersystem change of the UE from a wireless system to an EPS, wherein the mapped EPS security context comprises security parameters created based on a security context used for the wireless system, the security parameters enabling security-related communications between the UE and a network entity; determine an UL NAS COUNT value and a DL NAS COUNT value for the mapped EPS security context; and transmit, by the UE, a NAS message to the network entity, the NAS message including the UL NAS COUNT value of the mapped EPS security context.

In another aspect, an apparatus for wireless communication is provided that includes means for generating, by a UE, a mapped EPS security context associated with an intersystem change of the UE from a wireless system to an EPS, wherein the mapped EPS security context comprises security parameters created based on a security context used for the wireless system, the security parameters enabling security-related communications between the UE and a network entity; means for determining an UL NAS COUNT value and a DL NAS COUNT value for the mapped EPS security context; and means for transmitting, by the UE, a NAS message to the network entity, the NAS message including the UL NAS COUNT value of the mapped EPS security context.

In yet another aspect, a non-transitory computer-readable medium is provided including one or more processor executing code for generating, by a UE, a mapped EPS security context associated with an intersystem change of the UE from a wireless system to an EPS, wherein the mapped EPS security context comprises security parameters created based on a security context used for the wireless system, the security parameters enabling security-related communications between the UE and a network entity; code for determining an UL NAS COUNT value and a DL NAS COUNT value for the mapped EPS security context; and code for transmitting, by the UE, a NAS message to the network entity, the NAS message including the UL NAS COUNT value of the mapped EPS security context.

In another example, a method for wireless communication includes generating, by a first network entity, a mapped EPS security context associated with a request for an intersystem change of a UE from a wireless system to an EPS, wherein the mapped EPS security context includes security parameters created based on a security context used for the wireless system, the security parameters enabling security-related communications between the UE and a second network entity; determining an UL NAS COUNT value and a DL NAS COUNT value for the mapped EPS security context; and transmitting, by the first network entity, the mapped EPS security context with the UL NAS COUNT value and the DL NAS COUNT value to the second network entity.

In a further example, an apparatus for wireless communication is provided that includes a transceiver, a memory configured to store instructions, and one or more processors communicatively coupled with the transceiver and the memory. The aspect may include the one or more processors being configured execute instructions to generate, by a first network entity, a mapped EPS security context associated with a request for an intersystem change of a UE from a wireless system to an EPS, wherein the mapped EPS security context includes security parameters created based on a security context used for the wireless system, the security parameters enabling security-related communications between the UE and a second network entity; determine an UL NAS COUNT value and a DL NAS COUNT value for the mapped EPS security context; and transmit, by the first network entity, the mapped EPS security context with the UL NAS COUNT value and the DL NAS COUNT value to the second network entity.

In another aspect, an apparatus for wireless communication is provided that includes means for generating, by a first network entity, a mapped EPS security context associated with a request for an intersystem change of a UE from a wireless system to an EPS, wherein the mapped EPS security context includes security parameters created based on a security context used for the wireless system, the security parameters enabling security-related communications between the UE and a second network entity; means for determining an UL NAS COUNT value and a DL NAS COUNT value for the mapped EPS security context; and means for transmitting, by the first network entity, the mapped EPS security context with the UL NAS COUNT value and the DL NAS COUNT value to the second network entity.

In yet another aspect, a non-transitory computer-readable medium is provided including one or more processor executing code for generating, by a first network entity, a mapped EPS security context associated with a request for an intersystem change of a UE from a wireless system to an EPS, wherein the mapped EPS security context includes security parameters created based on a security context used for the wireless system, the security parameters enabling security-related communications between the UE and a second network entity; code for determining an UL NAS COUNT value and a DL NAS COUNT value for the mapped EPS security context; and code for transmitting, by the first network entity, the mapped EPS security context with the UL NAS COUNT value and the DL NAS COUNT value to the second network entity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the description.

FIG. 2B is a diagram illustrating an example of DL channels within a subframe, in accordance with certain aspects of the description.

FIG. 2C is a diagram illustrating an example of DL channels within a second frame, in accordance with certain aspects of the description.

FIG. 2D is a diagram illustrating an example of DL channels within UL channels within a subframe, in accordance with certain aspects of the description.

DETAILED DESCRIPTION

Figure 1:
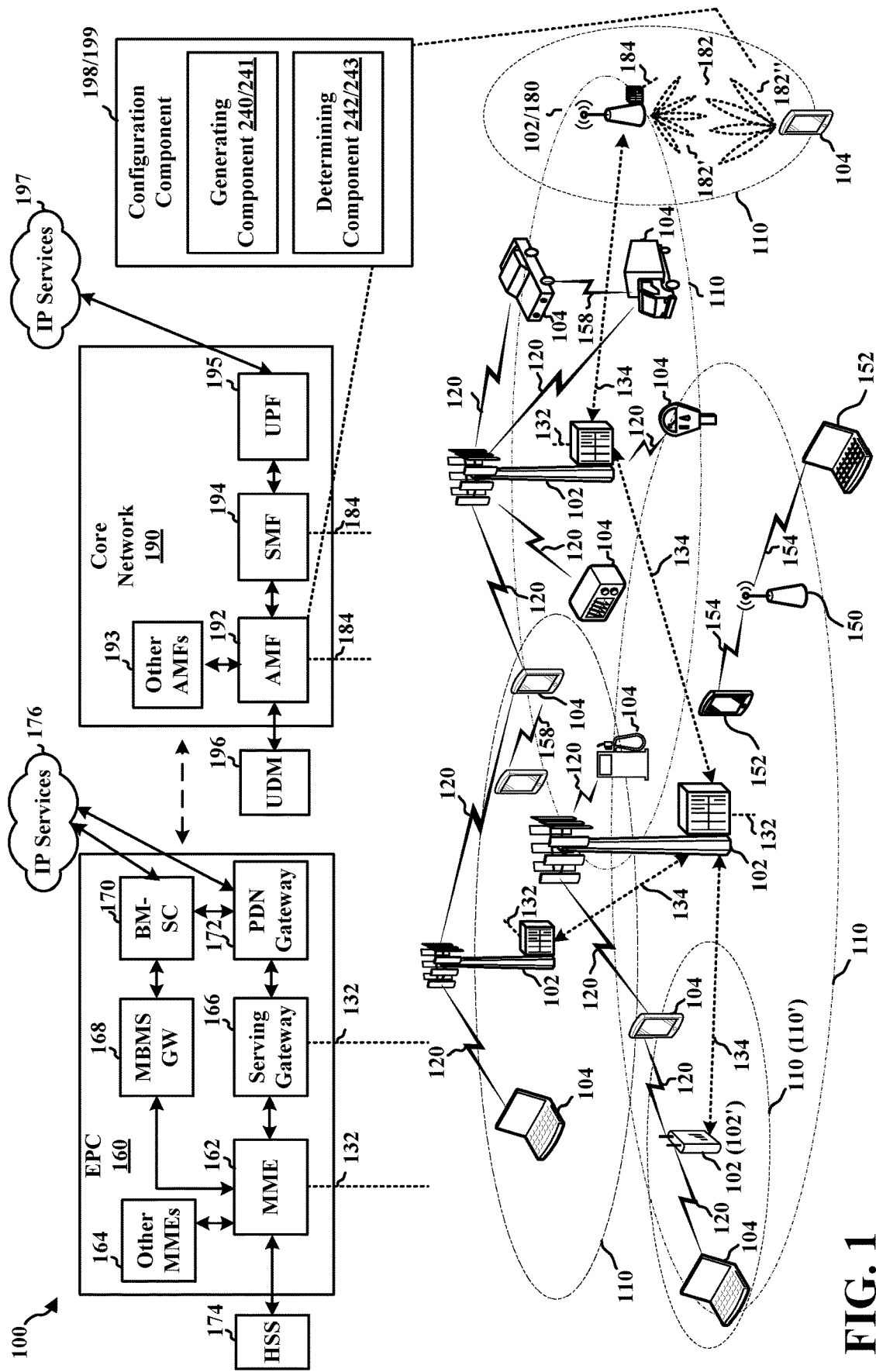
FIG. 1 is a diagram illustrating an example of a wireless communications system and an access network, in accordance with certain aspects of the description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to operate configuration component 198. For example, as described further herein, configuration component 198 may generate a mapped EPS security context associated with an intersystem change of the UE from a wireless system to an EPS, wherein the mapped EPS security context comprises security parameters created based a security context used for the wireless system, the security parameters enabling security-related communications between the UE and a network entity; determining an UL NAS COUNT value and a DL NAS COUNT value for the mapped EPS security context; and transmitting, by the UE, a NAS message to the network entity, the NAS message including the UL NAS COUNT value of the mapped EPS security context.

In certain aspects, the AMF 192 may be configured to operate configuration component 199. For example, as described further herein, configuration component 199 may generating, by network entity, a mapped EPS security context associated with request for an intersystem change of a UE from a wireless system to an EPS, wherein the mapped EPS security context includes security parameters created based a security context used for the wireless system, the security parameters enabling security-related communications between the UE and a second network entity; determining an UL NAS COUNT value and a DL NAS COUNT value for the mapped EPS security context; and transmitting, by the first network entity, the mapped EPS security context with the UL NAS COUNT value and the DL NAS COUNT value to the second network entity.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
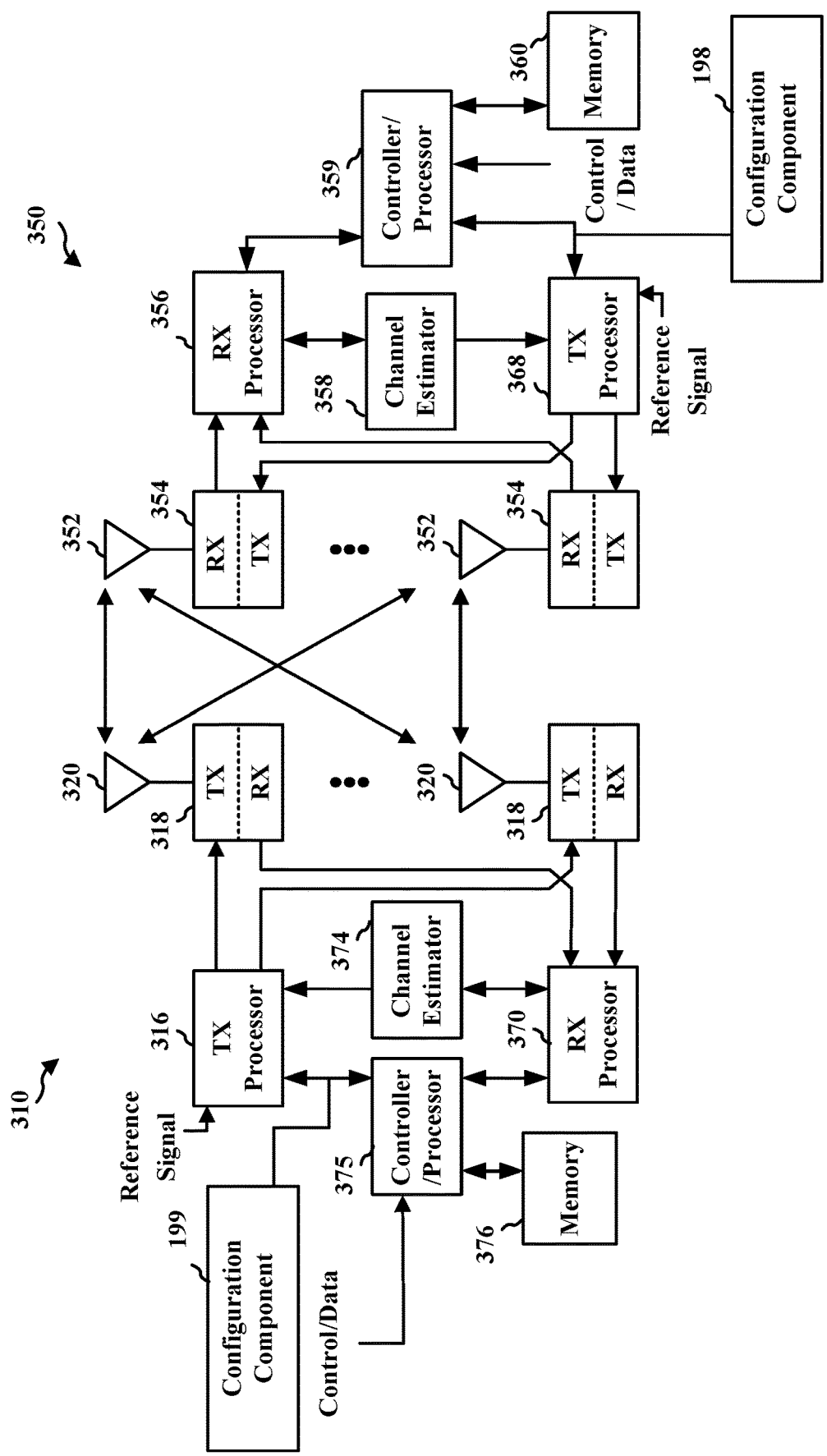
FIG. 3 is a diagram illustrating an example of a base station and user equipment (UE) in an access network, in accordance with certain aspects of the description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350.

IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

The described features generally relate to the configuration of a NAS COUNT value of a mapped EPS security context associated with an intersystem change of a UE from a wireless system (e.g., a 5G system) to an EPS. For example, in a wireless system to EPS mobility, the UE and/or Access and Mobility Management Function (AMF) create a mapped EPS security context. In generating the mapped EPS security context, the UE and AMF set the uplink and downlink NAS COUNTs to zero. However, setting the uplink and downlink NAS COUNTs to zero has unexpected issues due to either legacy Mobility Management Entity (MME) behavior or signaling optimization introduced in the wireless system to EPS mobility.

In an aspect, if UE sends a first uplink NAS message with uplink NAS COUNT=0 using the mapped EPS security context, then the MME will not accept the uplink NAS message because the MME doesn't expect the NAS COUNT=0 for the uplink NAS message in UE mobility. This issue can happen both in handover from the wireless system to EPS and in idle mode mobility from the wireless system to EPS. For the former case, the first uplink NAS message from UE to MME protected with the mapped EPS security context is the Tracking Area Update (TAU) request; for the latter case, the first uplink NAS message from UE to MME protected with the mapped EPS security context is the TAU complete.

In an example, after the completion of the wireless system to EPS handover, the UE sends a TAU request to update its location with uplink NAS COUNT=0. This may result in TAU request failure at the MME as the MME does not expect a TAU request with uplink NAS COUNT=0, i.e. the NAS COUNT in the TAU request is not larger than the stored NAS COUNT of the mapped EPS security context in the MME. Also, even if the TAU request is accepted at the MME, the MME sends a TAU accept with downlink NAS COUNT=0 to the UE. This may also cause the UE to drop the TAU accept as the UE does not expect the downlink NAS message with DL NAS COUNT=0 because the UE expects a downlink NAS COUNT larger than the stored downlink NAS COUNT in the mapped EPS security context.

In another example, in idle mode mobility from the wireless system to EPS, UE sends a TAU request protected using the current NAS security context. For the integrity protection of the TAU request, the UE uses the UL NAS COUNT of the NAS security context. This also introduces the similar issue as for the wireless system to EPS handover: the MME sends a TAU accept with DL NAS COUNT=0; the UE sends a TAU complete with UL NAS COUNT=0.

Furthermore, setting the NAS COUNTs to zero in the mapped EPS security context introduces a more serious security issue in idle mode mobility from the wireless system to EPS. In idle mode mobility from the wireless system to EPS, there are scenarios that UE and network need to setup AS security. For example, if the "active flag" is set in the TAU request message or the MME chooses to establish radio bearers when there is pending downlink UP data or pending downlink signaling, radio bearers will be established as part of the TAU procedure and a $K_{eNB}$ derivation is necessary. If there was no subsequent NAS SMC, the uplink NAS COUNT of the TAU request message sent from the UE to the MME is used as freshness parameter in the $K_{eNB}$ derivation using the KDF. The TAU request may be integrity protected.

Additionally, if $K_{eNB}$ needs to be derived for the above scenarios, the uplink NAS COUNT of the 5G NAS security context is used in $K_{eNB}$ derivation. However, this may cause UE and MME derive the same $K_{eNB}$ twice because the uplink NAS COUNT in the mapped EPS security context is set to zero and incremented for each uplink NAS message sent by the UE.

For example, in an aspect, the present disclosure includes a method, apparatus, and computer readable medium for wireless communications for configuring of a NAS COUNT value of a mapped EPS security context associated with an intersystem change of a UE from a wireless system to an EPS. The aspect may include generating, by a UE, a mapped EPS security context associated with an intersystem change of the UE from a wireless system to an EPS, wherein the mapped EPS security context comprises security parameters created based a security context used for the wireless system, the security parameters enabling security-related communications between the UE and a network entity; determining an UL NAS COUNT value and a DL NAS COUNT value for the mapped EPS security context; and transmitting, by the UE, a NAS message to the network entity, the NAS message including the UL NAS COUNT value of the mapped EPS security context.

In another example, in an aspect, the present disclosure includes a method, apparatus, and computer readable medium for wireless communications for generating, by a first network entity, a mapped EPS security context associated with receiving a request for an intersystem change of a UE from a wireless system to an EPS, wherein the mapped EPS security context includes security parameters created based a security context used for the wireless system, the security parameters enabling security-related communications between the UE and the network entity; determining an UL NAS COUNT value and a DL NAS COUNT value for the mapped EPS security context; and transmitting, by the first network entity, the mapped EPS security context with the UL NAS COUNT value and the DL NAS COUNT value to the second network entity.

Figure 4:
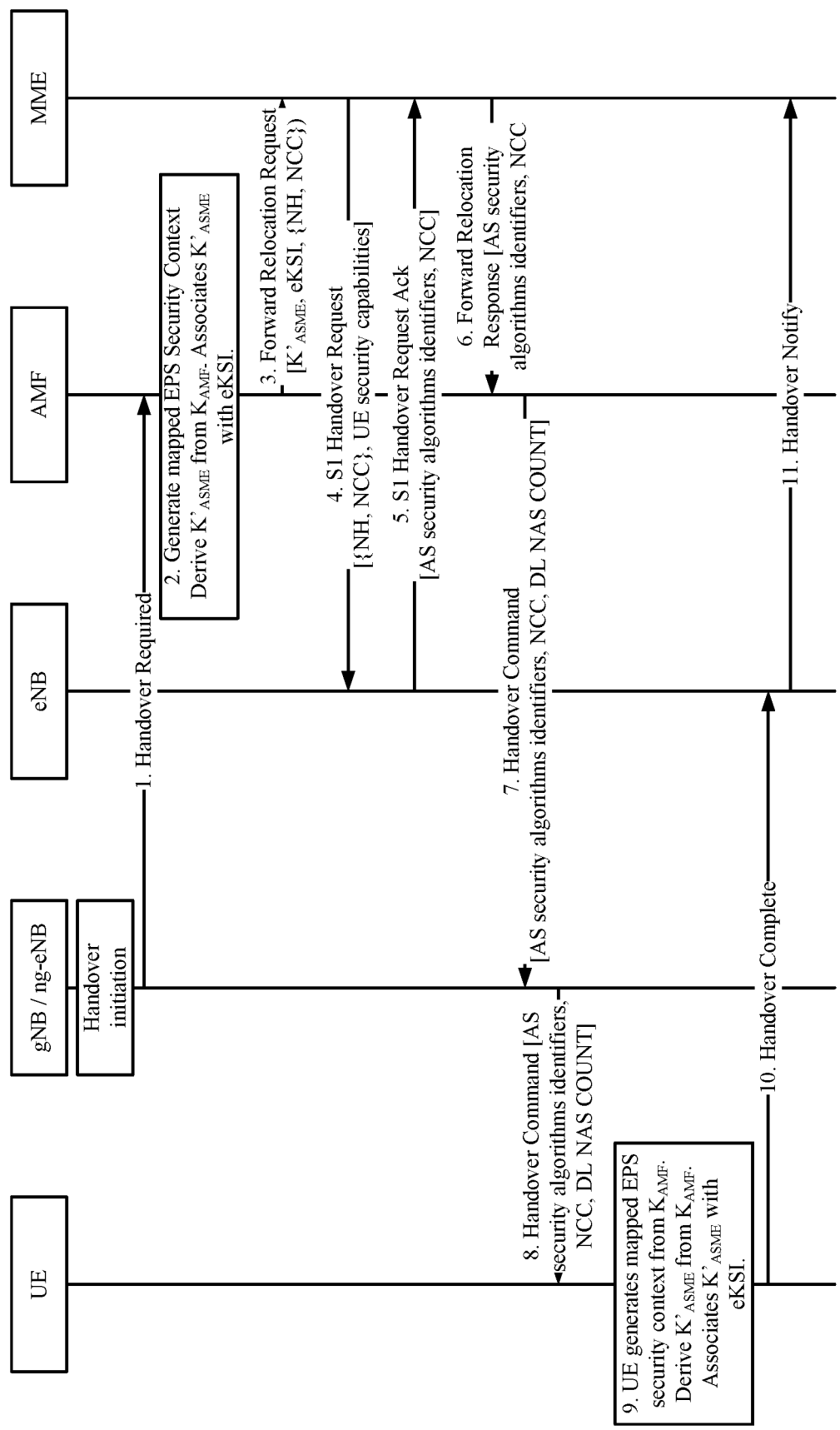
FIG. 4 is a diagram illustrating an example of a handover procedure from a wireless system to EPS for a UE, in accordance with certain aspects of the description.

FIG. 4 is a diagram 400 illustrating an example of a handover procedure from a wireless system to EPS for a UE. For example, the UE may be similar to or the same as UE 104 of FIG. 1, gNB/ng-eNB/eNB may be similar to or the same as base stations 102, AMF may be similar to or the same as AMF 192, and MME may be similar to or the same as MME 162.

In an aspect, at step 1, the gNB/ng-eNB sends a Handover Required message to the AMF, including the UE's identity and the UE's security capabilities. At step 2, when the source AMF performs a handover procedure to the EPC, after checking the UE's access rights and security capabilities, the source AMF prepares a UE context including a mapped EPS security context for the target MME.

To construct the mapped EPS security context, the source AMF derives a $K'_{ASME}$ using the $K_{AMF}$ key and the current downlink NAS COUNT of the current security context and then increments its stored downlink NAS COUNT value by one. The source AMF selects the EPS NAS algorithms identifiers (it has stored) to be used in the target MME at interworking handover to EPS, for encryption and integrity protection. In an example, AMF may generate a mapped EPS security context associated with a request for an intersystem change of a UE from a wireless system to an EPS. The mapped EPS security context includes security parameters created based a security context used for the wireless system, the security parameters enabling security-related communications between the UE and the network entity. The AMF may further determine a DL NAS COUNT value for the mapped EPS security context.

In certain aspects, a legacy target MME is expecting to receive the selected EPS NAS algorithms identifiers over N26 from the source AMF as the target MME believes the source AMF is another MME. The source AMF has therefore provisioned the EPS NAS security algorithms identifiers to be used at interworking handover to EPS to the UE in the NAS SMC in wireless access. The target MME could re-select different EPS NAS algorithms though to be used with the UE by running a NAS SMC in the following Tracking Area Update procedure.

At step 3. the source AMF transfers the UE security context (including new $K_{ASME}'$, eKSI, uplink and downlink EPS NAS COUNT's, UE EPS security capabilities, selected EPS NAS algorithms identifiers) to the target MME in the Forward Relocation Request message. The UE NR security capabilities may be sent by the source AMF as well. At step 4, when the target MME receives Forward Relocation Request message from source AMF, then the target MME derives EPS NAS keys (i.e., $K_{NASenc}$ and $K_{NASint}$) from the received $K_{ASME}'$ key with the received EPS NAS security algorithm identifiers as input, to be used in EPC. The target MME needs to include the {NH, NCC=2} pair and the UE security capabilities in the S1 HANDOVER REQUEST message to the target LTE eNB. The UE security capabilities include the UE EPS security capabilities received from the source AMF.

At step 5, upon receipt of the S1 HANDOVER REQUEST from the target MME, the target LTE eNB selects AS security algorithms from the UE EPS security capabilities and computes the $K_{eNB}$ to be used with the UE and proceed. The target LTE eNB then sends the selected AS security algorithms in the target to source transparent container in the S1 Handover Request Ack Message to the target MME. At step 6. the target MME includes the target to source transparent container received from the target LTE eNB in the Forward Relocation Response message sent to the source AMF. At step 7, the source AMF includes the target to source transparent container and the 8 LSB of the downlink NAS COUNT value used in $K_{ASME}'$ derivation in step 2, in the Handover command sent to the source gNB/ng-eNB.

At step 8, the source gNB/ng-eNB includes the target to source transparent container and the 8 LSB of the downlink NAS COUNT value in the Handover command sent to the UE. Upon the reception of the Handover Command message, the UE estimates the downlink NAS COUNT value using the received 8 LSB of the downlink NAS COUNT value and its stored downlink NAS COUNT value. The UE may ensure that the estimated downlink NAS COUNT value is greater than the stored downlink NAS COUNT value. Then, the UE may derive the mapped EPS security context, i.e. derive $K_{ASM}'$ from $K_{AMF}$ as described in clause 8.6.1 using the estimated downlink NAS COUNT value. After the derivation the UE may set the downlink NAS COUNT value in the NAS security context to the received downlink NAS COUNT value.

At step 9, the eKSI for the newly derived $K_{ASME}'$ key. The UE may also derive the EPS NAS keys (i.e. $K_{NASenc}$ and $K_{NASint}$) as the MME did in step 4 using the EPS NAS security algorithms identifiers stored in the ME and provisioned by the AMF to the UE in NAS SMC in earlier wireless access. The UE may also derive the initial $K_{eNB}$ from the $K_{ASME}'$ and the uplink NAS COUNT using $2^{32}-1$ as the value of the uplink NAS COUNT parameter. For example, the UE may generate a mapped EPS security context associated with an intersystem change of the UE from a wireless system to an EPS. The mapped EPS security context comprises security parameters created based a security context used for the wireless system, the security parameters enabling security-related communications between the UE and a network entity. The UE may further determine an UL NAS COUNT value and a DL NAS COUNT value for the mapped EPS security context.

At step 10, the UE sends the Handover Complete message to the target LTE eNB. The UE may cipher and integrity protect this message using the newly created mapped EPS security context. At step 11, the target LTE eNB notifies the target MME with a Handover Notify message.

Figure 5:
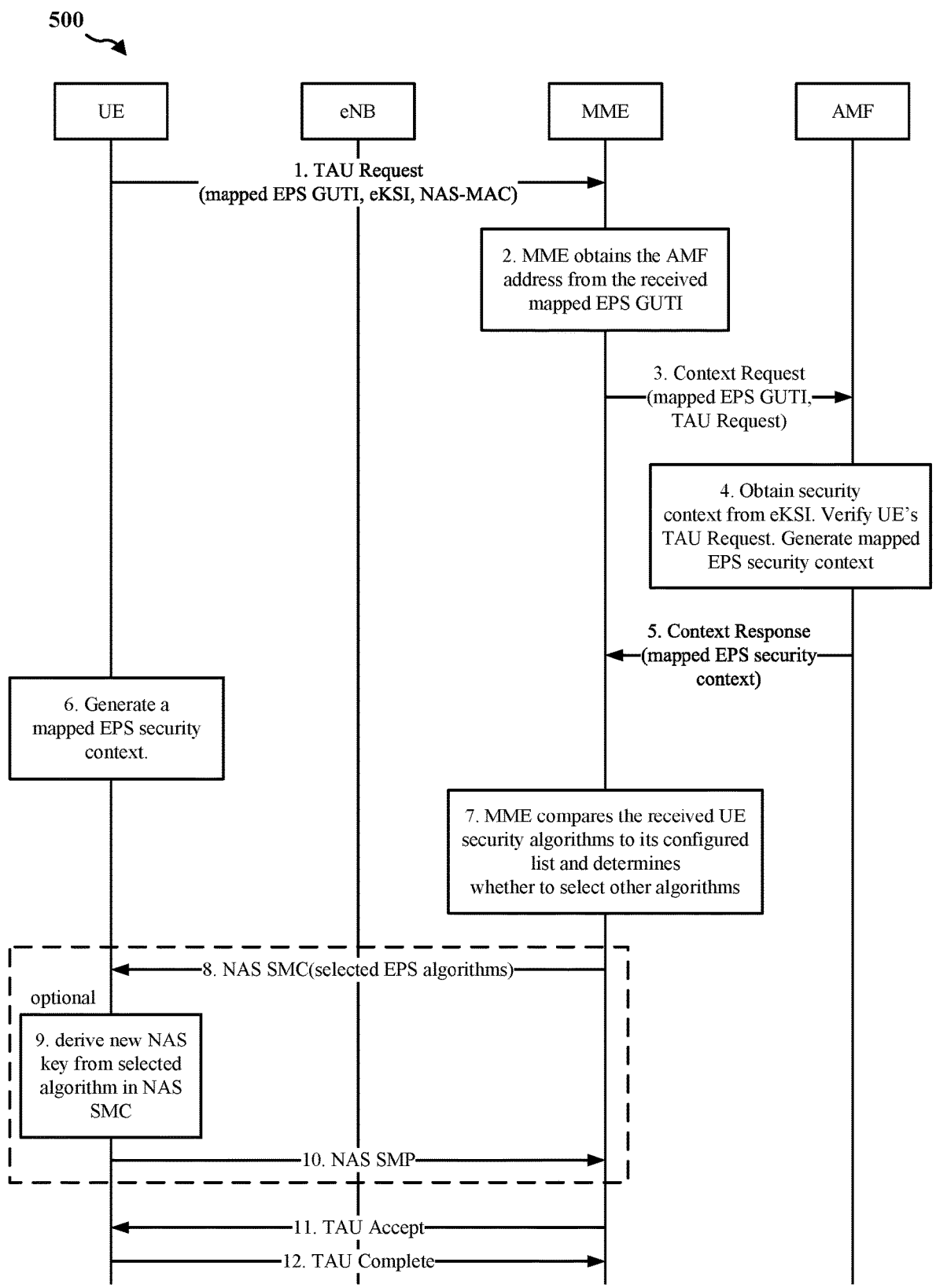
FIG. 5 is a diagram illustrating an example of idle mode mobility from a wireless system to EPS for a UE, in accordance with certain aspects of the description.

FIG. 5 is a diagram 500 illustrating an example of idle mode mobility from a wireless system to EPS for a UE. For example, the UE may be similar to or the same as UE 104 of FIG. 1, gNB/ng-eNB/eNB may be similar to or the same as base stations 102, AMF may be similar to or the same as AMF 192, and MME may be similar to or the same as MME 162.

At step 1, the UE initiates the TAU procedure by sending a TAU Request to the MME with a mapped EPS GUTI derived from the GUTI and its EPS security capabilities. The mapped EPS GUTI contains the information of the AMF that has the latest UE context in the wireless network.

The UE integrity protects the TAU Request message using the current NAS security context identified by the GUTI used to derive the mapped EPS GUTI. More precisely, the UE may compute the NAS MAC for the TAU request as it is done for a NAS message over a 3GPP access. The NAS Uplink COUNT for integrity protection of the TAU request may use the same value as the NAS Uplink COUNT. Consequently, this results in an increase of the stored NAS Uplink COUNT value in the NAS COUNT pair associated with the 3GPP access. The corresponding ngKSI value of the Security context is included in the eKSI parameter of the TAU Request message.

At step 2, upon receipt of the TAU Request, the MME obtains the AMF address from the mapped EPS GUTI value. At step 3, the MME forwards the complete TAU Request message including the eKSI, NAS-MAC and mapped EPS GUTI in the Context Request message.

At step 4, the AMF may use the eKSI value field to identify the NAS security context and use it to verify the TAU Request message as if it was a NAS message received over 3GPP access. In an example, AMF may generate a mapped EPS security context associated with receiving a request for an intersystem change of a UE from a wireless system to an EPS. The mapped EPS security context includes security parameters created based a security context used for the wireless system, the security parameters enabling security-related communications between the UE and the network entity. The AMF may further determine an UL NAS COUNT value and a DL NAS COUNT value for the mapped EPS security context.

At step 5, if the verification is successful, the AMF may derive a mapped EPS NAS security context. The AMF may set the EPS NAS algorithms to the ones indicated earlier to the UE in a NAS SMC. The AMF may include the mapped EPS NAS security context in the Context Response message it sends to the MME. The AMF may never transfer security parameters to an entity outside the wireless system.

At step 6, the UE may derive a mapped EPS NAS security context. The UE may select the EPS algorithms using the ones received in an earlier NAS SMC from the AMF. The UE may immediately activate the mapped EPS security context and be ready to use it for the processing of the TAU Accept message in step 7. For example, the UE may generate a mapped EPS security context associated with an intersystem change of the UE from a wireless system to an EPS. The mapped EPS security context comprises security parameters created based a security context used for the wireless system, the security parameters enabling security-related communications between the UE and a network entity. The UE may further determine an UL NAS COUNT value and a DL NAS COUNT value for the mapped EPS security context.

At step 7, the MME compares the UE security algorithms to its configured list after it receives the Context Response message. If an algorithm change is required, the MME may select the NAS algorithm which has the highest priority from its configured list and is also present in the UE security capabilities and initiate an NAS SMC to the UE. Otherwise, steps 8-10 may be skipped. At steps 8-10, the MME and the UE performs an NAS SMC to derive new NAS keys with the new algorithms. For example, at step 8, the MME transmits a NAS SMC corresponding to the selected EPS algorithms. At step 9, the UE may derive new a NAS key from the selected algorithm in the NAS SMC. At step 10, the UE may transmit the NAS SMP after deriving the NAS key. At step 11, the MME completes the procedure with a TAU Accept message. At step 12, the UE transmits the TAU complete message to the MME.

Figure 6:
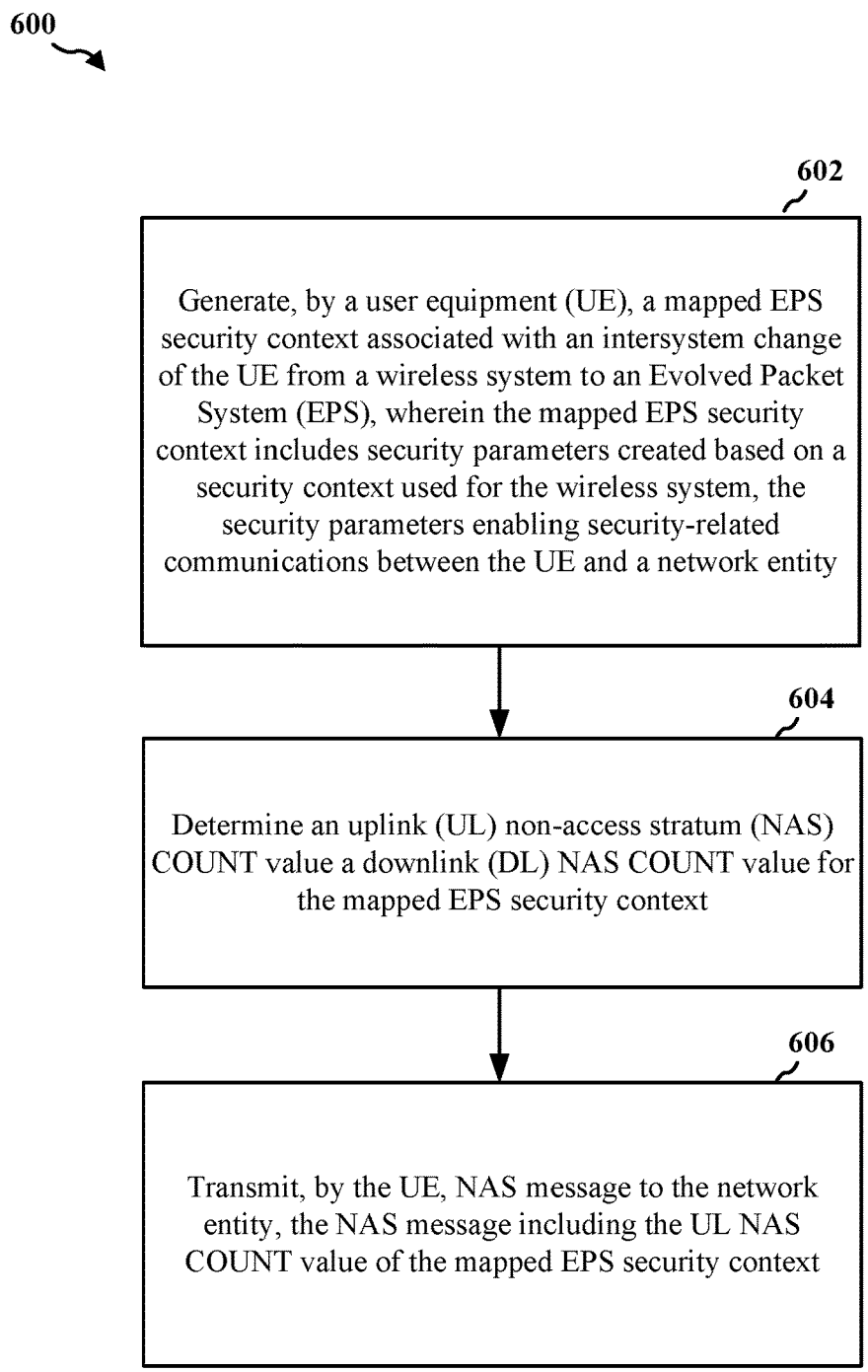
FIG. 6 is a flowchart of a method of wireless communication of a UE configuring a NAS COUNT value of a mapped EPS security context associated with an intersystem change of a UE from a wireless system to an EPS, in accordance with certain aspects of the description.

FIG. 6 is a flowchart 600 of a method of wireless communication. The method may be performed by a UE (e.g., the UE 104; the apparatus 902/82'; the processing system 914, which may include the memory 360 and which may be the entire UE 104 or a component of the UE 104, such as the TX processor 368, the RX processor 356, and/or the controller/processor 359).

At 602, method 600 includes generating, by a user equipment (UE), a mapped Evolved Packet System (EPS) security context associated with an intersystem change of the UE from a wireless system to an EPS, wherein the mapped EPS security context comprises security parameters created based on a security context used for the wireless system, the security parameters enabling security-related communications between the UE and a network entity. In an aspect, configuration component 198, e.g., in conjunction with processor(s) 359/904, memory(s) 360/906, and generating component 240 may generate a mapped EPS security context associated with an intersystem change of the UE 104 from a wireless system to an EPS. The mapped EPS security context comprises security parameters created based a security context used for the wireless system, the security parameters enabling security-related communications between the UE 104 and a network entity (e.g., MME 132). As such, the UE 104 and/or the configuration component 198, e.g., in conjunction with controller/processor 359, which may include the memory 360, processor(s) 912, which may include the memory 916, modem 940, TX processor 368, and transceiver 902 may define a means for generating, by a UE, a mapped EPS security context associated with an intersystem change of the UE from a wireless system to an EPS, wherein the mapped EPS security context comprises security parameters created based on a security context used for the wireless system, the security parameters enabling security-related communications between the UE and a network entity.

At 604, method 600 includes determining an uplink (UL) non-access stratum (NAS) COUNT value and a downlink (DL) NAS COUNT value for the mapped EPS security context. In an aspect, configuration component 198, e.g., in conjunction with processor(s) 359/904, memory(s) 360/906, and determining component 242 may determine an UL NAS COUNT value and a DL NAS COUNT value for the mapped EPS security context. As such, the UE 104 and/or the configuration component 198, e.g., in conjunction with controller/processor 359, which may include the memory 360, processor(s) 912, which may include the memory 916, modem 940, TX processor 368, and transceiver 902 may define a means for determining an UL NAS COUNT value and a DL NAS COUNT value for the mapped EPS security context.

At 606, method 600 includes transmitting, by the UE, a NAS message to the network entity, the NAS message including the UL NAS COUNT value of the mapped EPS security context. In an aspect, configuration component 198, e.g., in conjunction with processor(s) 359/904, memory(s) 360/906, TX processor 368, and transceiver 910 may transmit a NAS message to the network entity, the NAS message including the UL NAS COUNT value of the mapped EPS security context. As such, the UE 104 and/or the configuration component 198, e.g., in conjunction with controller/processor 359, which may include the memory 360, processor(s) 912, which may include the memory 916, modem 940, TX processor 368, and transceiver 902 may define a means for transmitting a NAS message to the network entity, the NAS message including the UL NAS COUNT value of the mapped EPS security context.

In an example, determining the UL NAS COUNT value for the mapped EPS security context further comprises setting the UL NAS COUNT value to the UL NAS COUNT value of the security context. And, determining the DL NAS COUNT value for the mapped EPS security context further comprises setting the DL NAS COUNT value to the DL NAS COUNT value of the security context.

In another example, determining the UL NAS COUNT value for the mapped EPS security context further comprises resetting the UL NAS COUNT value to 0. And, determining the DL NAS COUNT value for the mapped EPS security context further comprises resetting the DL NAS COUNT value to 0. For example, method 600 may include incrementing the UL NAS COUNT value by 1 upon resetting the UL NAS COUNT value to 0; and transmitting the NAS message to the network entity further comprises transmitting the NAS message to the network entity with the UL NAS COUNT value.

In an example, the intersystem change of the UE from the wireless system to the EPS corresponds to a handover procedure of the UE from the wireless system to the EPS. For example, method 600 may include the configuration component 198 receiving, at the UE 104, a handover command in response to the handover procedure of the UE from the wireless system to the EPS, the handover command including the security parameters for generating the mapped EPS security context; and wherein generating the mapped EPS security context further comprises generating the mapped EPS security context based on the handover command. In an example, receiving the handover command further comprises receiving the handover command from an Access Mobility and Management Function (AMF).

In an example, the intersystem change of the UE from the wireless system to the EPS corresponds to an idle mode mobility of the UE from the wireless system to the EPS. For example, method 600 may include transmitting, by the UE, a Tracking Area Update (TAU) Request to the network entity, the TAU Request including the previous UL NAS COUNT value of the security context; and wherein generating the mapped EPS security context further comprises generating the mapped EPS security context subsequent to transmitting the TAU Request.

Figure 7:
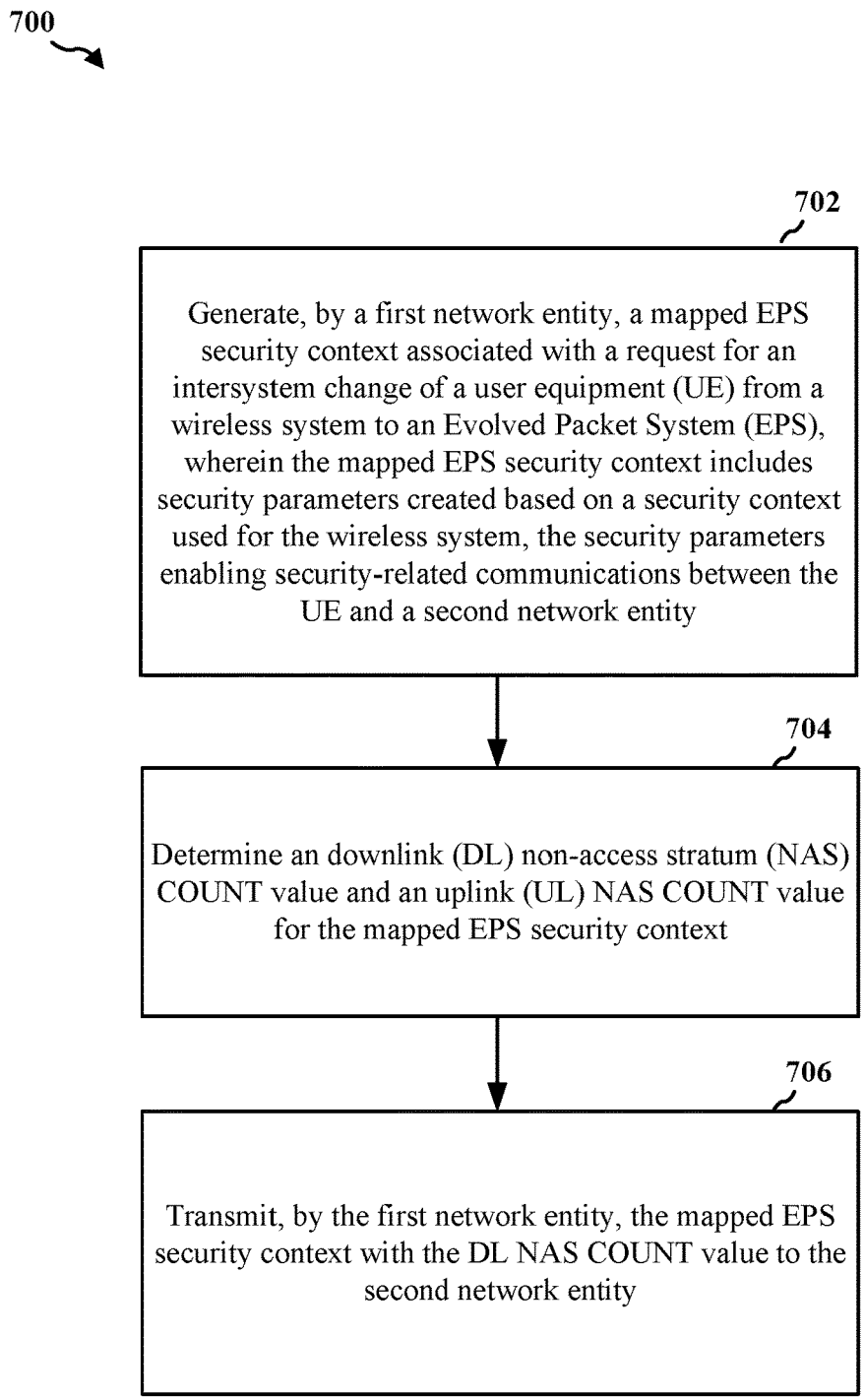
FIG. 7 is a flowchart of a method of wireless communication of a network entity configuring a NAS COUNT value of a mapped EPS security context associated with an intersystem change of a UE from a wireless system to an EPS, in accordance with certain aspects of the description.

FIG. 7 is a flowchart 700 of a method of wireless communication. The method may be performed by a network entity (e.g., the AMF 192; the apparatus 902/82'; the processing system 914, which may include the memory 376 and which may be the entire AMF 192 or a component of the AMF 192, such as the TX processor 316, the RX processor 370, and/or the controller/processor 375).

At 702, method 700 includes generating, by network entity, a mapped Evolved Packet System (EPS) security context associated with receiving a request for an intersystem change of a user equipment (UE) from a wireless system to an EPS, wherein the mapped EPS security context includes security parameters created based on a security context used for the wireless system, the security parameters enabling security-related communications between the UE and the network entity. In an aspect, configuration component 199, e.g., in conjunction with processor(s) 375/1104, memory(s) 376/1106, and generating component 241 may generate a mapped EPS security context associated with receiving a request for an intersystem change of a UE 104 from a wireless system to an EPS. The mapped EPS security context includes security parameters created based on a 5G security context used for the wireless system, the security parameters enabling security-related communications between the UE 104 and the network entity (e.g., AMF 192). As such, the network entity 102 and/or the configuration component 199, e.g., in conjunction with controller/processor 375, which may include the memory 376, processor 1112, which may include the memory 1106, RX processor 370, and transceiver 1110 may define a means for generating, by network entity, a mapped EPS security context associated with receiving a request for an intersystem change of a UE from a wireless system to an EPS, wherein the mapped EPS security context includes security parameters created based on a security context used for the wireless system, the security parameters enabling security-related communications between the UE and the network entity.

At 704, method 700 includes determining an uplink (UL) non-access stratum (NAS) COUNT value and a downlink (DL) NAS COUNT value for the mapped EPS security context. In an aspect, configuration component 199, e.g., in conjunction with processor(s) 375/904, memory(s) 376/906, and determining component 243 may determine an UL NAS COUNT value and a DL NAS COUNT value for the mapped EPS security context. As such, the network entity 102 and/or the configuration component 199, e.g., in conjunction with controller/processor 375, which may include the memory 376, processor 1112, which may include the memory 1106, RX processor 370, and transceiver 1110 may define a means for determining an UL NAS COUNT value and a DL NAS COUNT value for the mapped EPS security context.

At 706, method 700 includes transmitting, by the first network entity, the mapped EPS security context with the UL NAS COUNT value and the DL NAS COUNT value to the second network entity. In an aspect, configuration component 199, e.g., in conjunction with processor(s) 375/1104, memory(s) 376/1106, Tx processor 316, and transceiver 1110 may transmit the mapped EPS security context with the UL NAS COUNT value and the DL NAS COUNT value to the second network entity. As such, the network entity 102 and/or the configuration component 199, e.g., in conjunction with controller/processor 375, which may include the memory 376, processor 1112, which may include the memory 1106, RX processor 370, and transceiver 1110 may define a means for transmitting the mapped EPS security context with the UL NAS COUNT value and the DL NAS COUNT value to the second network entity.

In an example, determining the UL NAS COUNT value for the mapped EPS security context further comprises setting the UL NAS COUNT value to the UL NAS COUNT value of the security context. And, determining the DL NAS COUNT value for the mapped EPS security context further comprises setting the DL NAS COUNT value to the DL NAS COUNT value of the security context.

In an example, determining the UL NAS COUNT value for the mapped EPS security context further comprises resetting the UL NAS COUNT value to 0. And, determining the DL NAS COUNT value for the mapped EPS security context further comprises resetting the DL NAS COUNT value to 0. The DL NAS COUNT is incremented by 1 similar to the UL NAS COUNT by the UE in FIG. 6.

In an example, the intersystem change of the UE from the wireless system to the EPS corresponds to a handover procedure of the UE from the wireless system to the EPS. For example, method 700 may include receiving, at the first network entity, a handover required message in response to an initiation of the handover procedure of the UE from the wireless system to the EPS, the handover required message including one or more security capabilities of the UE; and wherein generating the mapped EPS security context further comprises generating the mapped EPS security context based on the handover required message.

In an example, the intersystem change of the UE from the wireless system to the EPS corresponds to an idle mode mobility of the UE from the wireless system to the EPS. For example, method 700 may include receiving, by the first network entity, a Tracking Area Update (TAU) Request forwarded from the second network entity, the TAU Request being transmitted by the UE and including the previous UL NAS COUNT value of the security context; and wherein generating the mapped EPS security context further comprises generating the mapped EPS security context based on receiving the TAU Request.

In an example, the first network entity corresponds to an Access and Mobility Management Function (AMF).

In an example, the second network entity corresponds to a Mobility Management Entity (MME).

Figure 8:
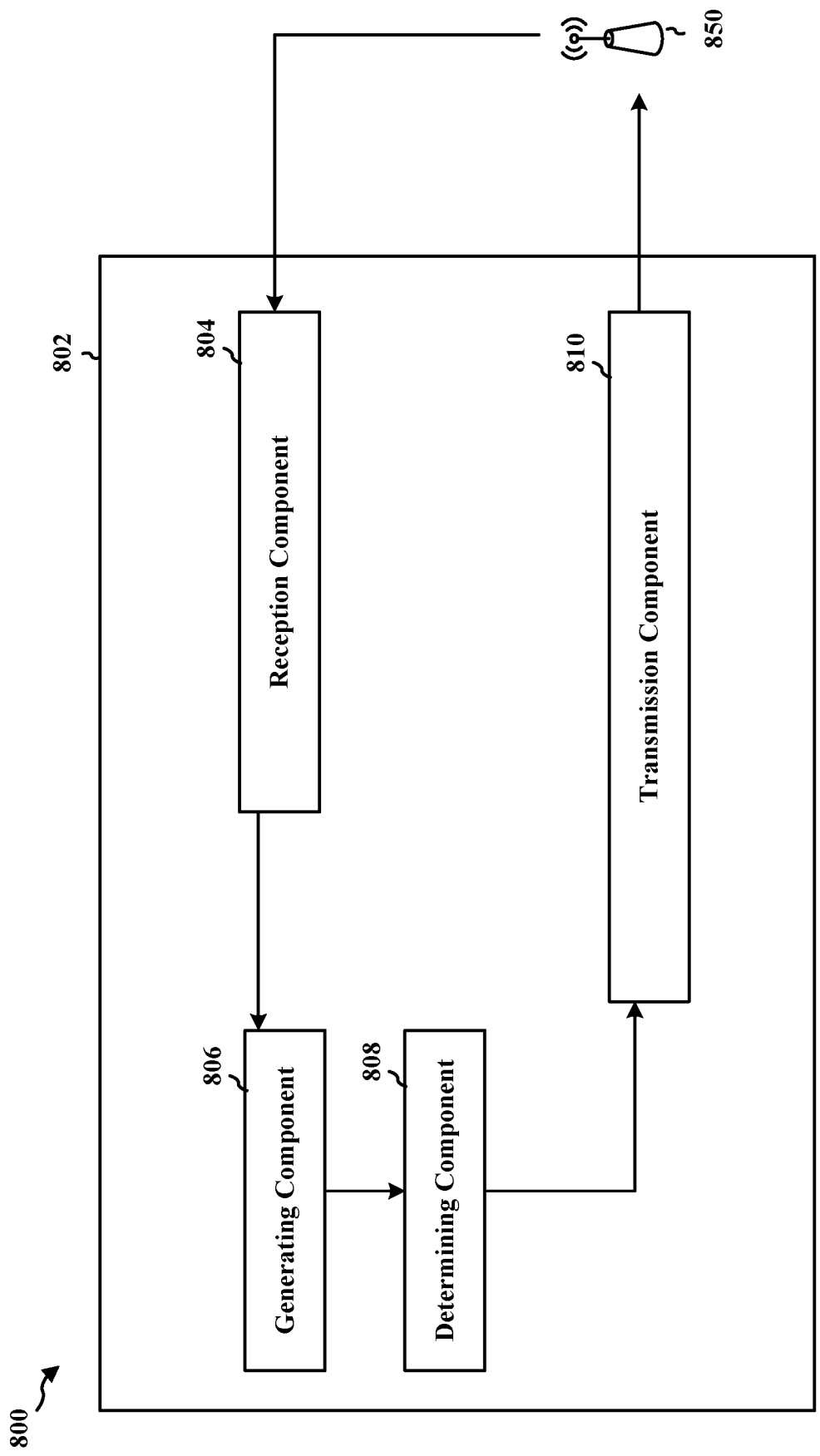
FIG. 8 is a conceptual data flow diagram illustrating the data flow between different means/components in an example apparatus, in accordance with certain aspects of the description.

FIG. 8 is a conceptual data flow diagram 800 illustrating the data flow between different means/components in an example apparatus 802. The apparatus may be a UE 104 and/or network entity (e.g., AMF 192). The apparatus includes a component 804 that receives signals to from remote device 850. The apparatus includes a component 806 that generates a mapped EPS security context associated with an intersystem change of the UE from a wireless system (e.g., 5G system) to an EPS, e.g., as described in connection with blocks 602 and 702. The apparatus includes a component 808 that determining an UL/DL NAS COUNT value for the mapped EPS security context, e.g., as described in connection with blocks 604 and 704. The apparatus includes a component 810 that transmits the mapped EPS security context, e.g., as described in connection with blocks 606 and 706.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
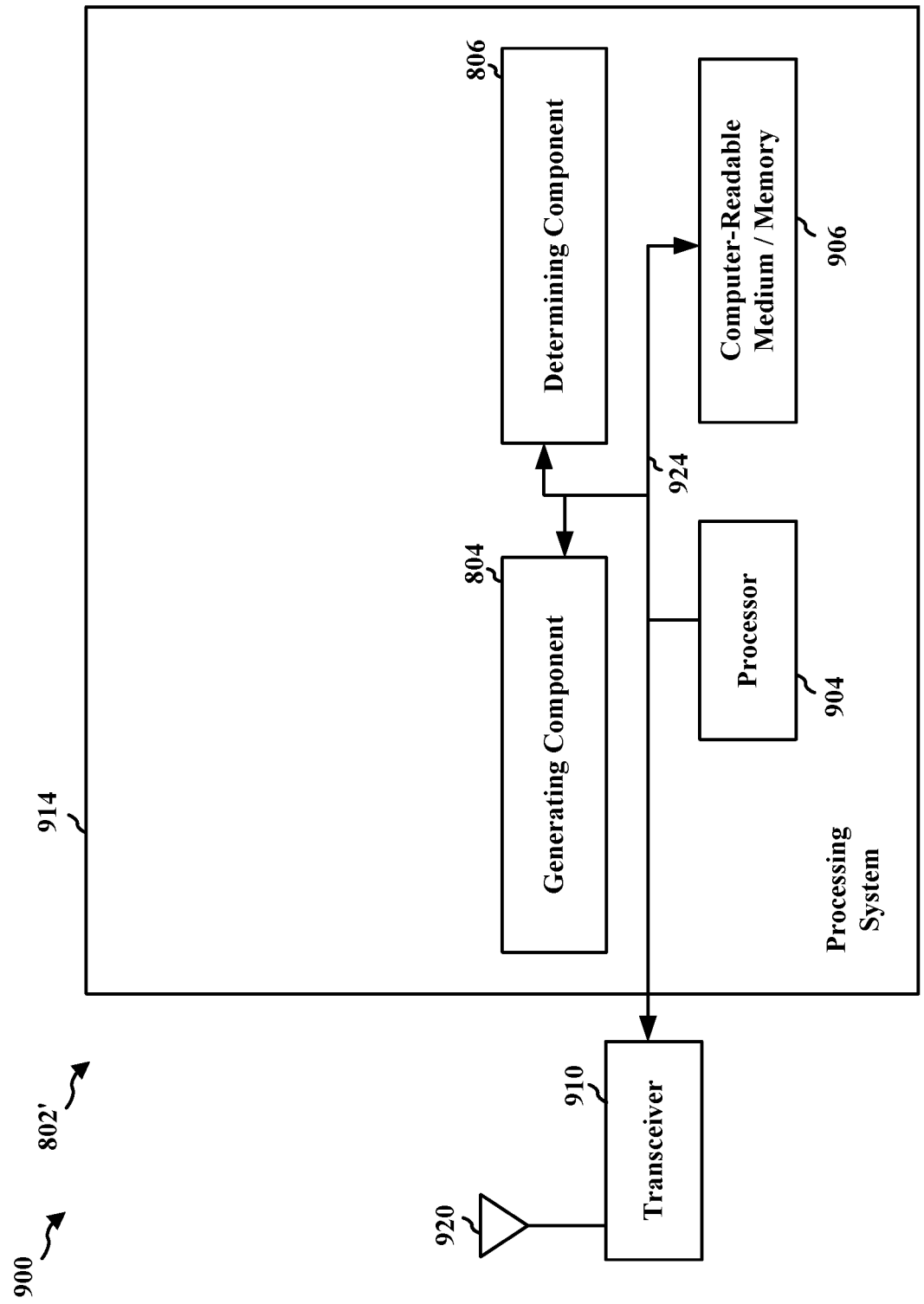
FIG. 9 is a diagram illustrating an example of a hardware implementation for an apparatus employing a processing system, in accordance with certain aspects of the description.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808. The components may be software components running in the processor 904, resident/stored in the computer readable medium/memory 906, one or more hardware components coupled to the processor 904, or some combination thereof. The processing system 914 may be a component of the base station 310 and may include the memory 376 and/or at least one of the TX processor 316, the RX processor 370, and the controller/processor 375. Alternatively, the processing system 914 may be the entire base station (e.g., see 310 of FIG. 3). The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for generating, by network entity, a mapped EPS security context in response to receiving a request for an intersystem change of a UE from a wireless system to an EPS, wherein the mapped EPS security context includes security parameters created based a security context used for the wireless system, the security parameters enabling security-related communications between the UE and the network entity; means for determining a DL NAS COUNT value for the mapped EPS security context, wherein the DL NAS COUNT value increments by 1 from a previous DL NAS COUNT value of the security context without reset; and means for transmitting, by the network entity, the mapped EPS security context with the DL NAS COUNT value to the UE subsequent to receiving the request for the intersystem change of the UE from the wireless system to the EPS. The aforementioned means may be one or more of the aforementioned components of the apparatus 802 and/or the processing system 914 of the apparatus 802' configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In one configuration, the apparatus 802/802' for wireless communication includes means for generating, by a UE, a mapped EPS security context in response to an intersystem change of the UE from a wireless system to an EPS, wherein the mapped EPS security context comprises security parameters created based a security context used for the wireless system, the security parameters enabling security-related communications between the UE and a network entity; means for determining an UL NAS COUNT value for the mapped EPS security context, wherein the UL NAS COUNT value increments by 1 from a previous UL NAS COUNT value of the security context without reset; and means for transmitting, by the UE, the mapped EPS security context with the UL NAS COUNT value to the network entity subsequent to the intersystem change of the UE from the wireless system to the EPS. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
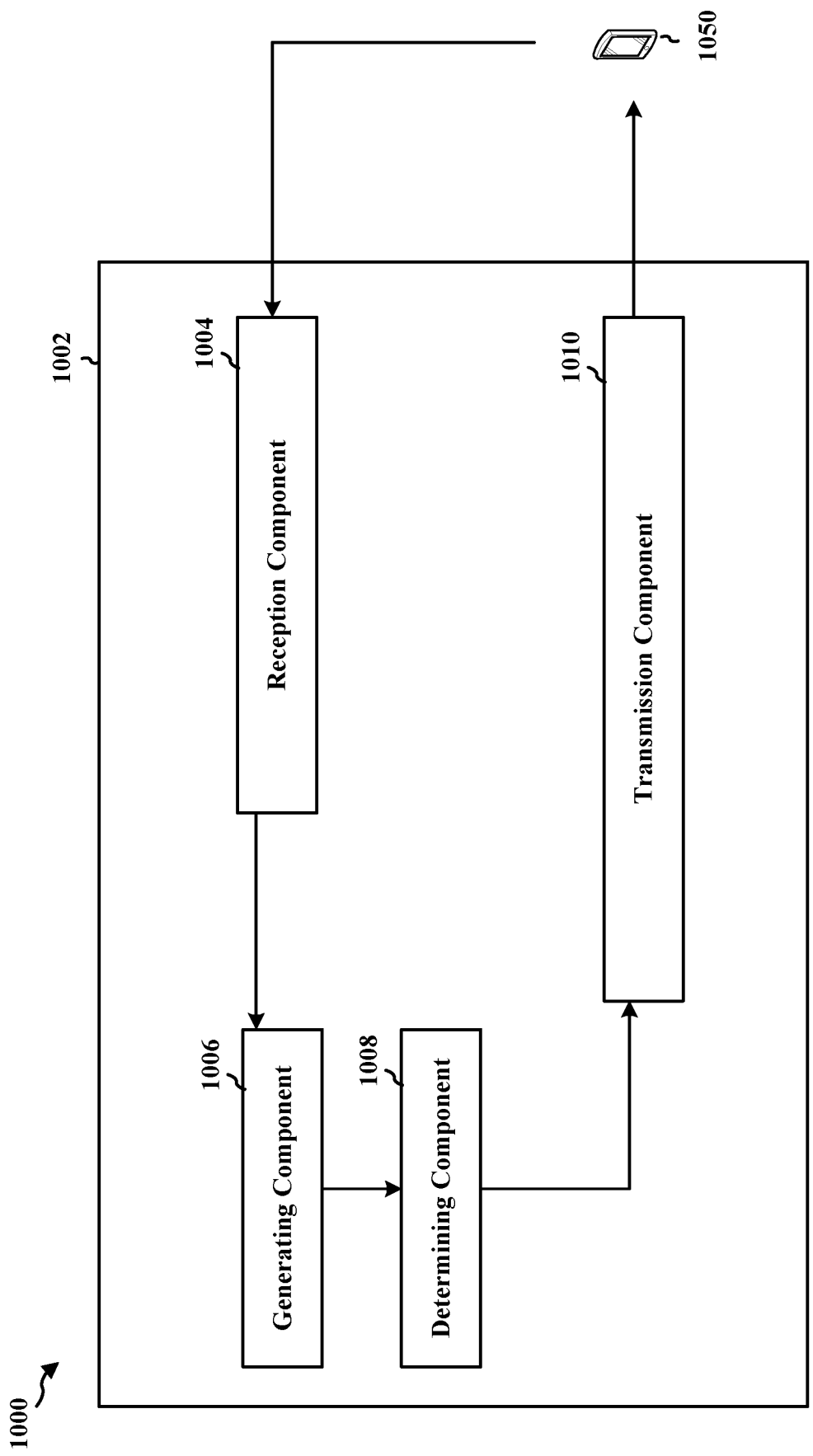
FIG. 10 is a conceptual data flow diagram illustrating the data flow between different means/components in an example apparatus, in accordance with certain aspects of the description.

FIG. 10 is a conceptual data flow diagram 1000 illustrating the data flow between different means/components in an example apparatus 1002. The apparatus may be a UE 104 and/or network entity (e.g., AMF 192). The apparatus includes a component 1004 that receives signals to from remote device 1050. The apparatus includes a component 1006 that generates a mapped EPS security context associated with an intersystem change of the UE from a wireless system to an EPS, e.g., as described in connection with blocks 602 and 702. The apparatus includes a component 1008 that determining an UL/DL NAS COUNT value for the mapped EPS security context, e.g., as described in connection with blocks 604 and 704. The apparatus includes a component 1010 that transmits the mapped EPS security context, e.g., as described in connection with blocks 606 and 706.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
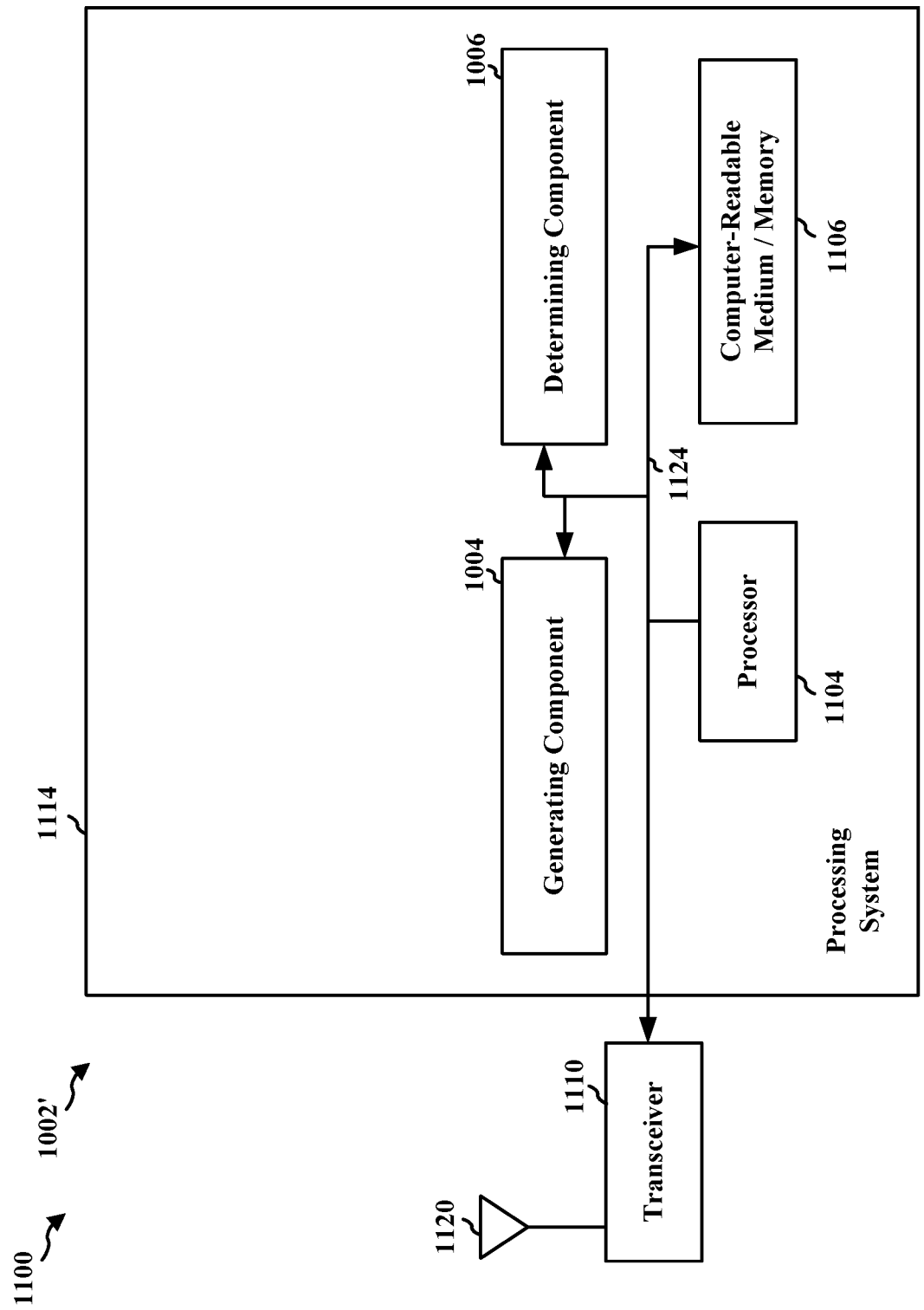
FIG. 11 is a diagram illustrating an example of a hardware implementation for an apparatus employing a processing system, in accordance with certain aspects of the description.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3). The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/802' for wireless communication includes means for generating, by network entity, a mapped EPS security context in response to receiving a request for an intersystem change of a UE from a wireless system to an EPS, wherein the mapped EPS security context includes security parameters created based a security context used for the wireless system, the security parameters enabling security-related communications between the UE and the network entity; means for determining a DL NAS COUNT value for the mapped EPS security context, wherein the DL NAS COUNT value increments by 1 from a previous DL NAS COUNT value of the security context without reset; and means for transmitting, by the network entity, the mapped EPS security context with the DL NAS COUNT value to the UE subsequent to receiving the request for the intersystem change of the UE from the wireless system to the EPS. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In one configuration, the apparatus 1002/802' for wireless communication includes means for generating, by a UE, a mapped EPS security context in response to an intersystem change of the UE from a wireless system to an EPS, wherein the mapped EPS security context comprises security parameters created based a security context used for the wireless system, the security parameters enabling security-related communications between the UE and a network entity; means for determining an UL NAS COUNT value for the mapped EPS security context, wherein the UL NAS COUNT value increments by 1 from a previous UL NAS COUNT value of the security context without reset; and means for transmitting, by the UE, the mapped EPS security context with the UL NAS COUNT value to the network entity subsequent to the intersystem change of the UE from the wireless system to the EPS. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

For example, in an aspect, the present disclosure includes a method, apparatus, and computer readable medium for wireless communications for configuring of a NAS COUNT value of a mapped EPS security context associated with an intersystem change of a UE from a wireless system to an EPS. The aspect may include generating, by a UE, a mapped EPS security context associated with an intersystem change of the UE from a wireless system to an EPS, wherein the mapped EPS security context comprises security parameters created based a security context used for the wireless system, the security parameters enabling security-related communications between the UE and a network entity; determining an UL NAS COUNT value for the mapped EPS security context; and transmitting, by the UE, a NAS message to the network entity, the NAS message including the UL NAS COUNT value of the mapped EPS security context.

In another example, in an aspect, the present disclosure includes a method, apparatus, and computer readable medium for wireless communications for generating, by a first network entity, a mapped EPS security context associated with receiving a request for an intersystem change of a UE from a wireless system to an EPS, wherein the mapped EPS security context includes security parameters created based a security context used for the wireless system, the security parameters enabling security-related communications between the UE and a second network entity; determining a DL NAS COUNT value for the mapped EPS security context; and transmitting, by the first network entity, the mapped EPS security context with the DL NAS COUNT value to the second network entity.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   generating, by a user equipment (UE), a mapped Evolved Packet System (EPS) security context associated with an intersystem change of the UE from a wireless system to an EPS, wherein the mapped EPS security context comprises security parameters created based on a security context used for the wireless system, the security parameters enabling security-related communications between the UE and a network entity;
   setting an uplink (UL) non-access stratum (NAS) COUNT value for the mapped EPS security context to a current UL NAS COUNT value of the security context;
   setting a downlink (DL) NAS COUNT value for the mapped EPS security context to a current DL NAS COUNT value of the security context; and
   transmitting, by the UE, a NAS message to the network entity, the NAS message including the UL NAS COUNT value of the mapped EPS security context.

2. The method of claim 1, wherein the intersystem change of the UE from the wireless system to the EPS corresponds to a handover procedure of the UE from the wireless system to the EPS.

3. The method of claim 2, further comprising:
   receiving, at the UE, a handover command in response to the handover procedure of the UE from the wireless system to the EPS, the handover command including the security parameters for generating a mapped EPS security context; and
   wherein generating the mapped EPS security context further comprises generating the mapped EPS security context based on the handover command.

4. The method of claim 3, wherein receiving the handover command further comprises receiving the handover command from an Access Mobility and Management Function (AMF).

5. The method of claim 1, wherein the intersystem change of the UE from the wireless system to the EPS corresponds to an idle mode mobility of the UE from the wireless system to the EPS.

6. The method of claim 5, further comprising:
   transmitting, by the UE, a Tracking Area Update (TAU) Request to the network entity, the TAU Request including the UL NAS COUNT value of the security context; and
   wherein generating the mapped EPS security context further comprises generating the mapped EPS security context subsequent to transmitting the TAU Request.

7. The method of claim 1, wherein the network entity corresponds to a Mobility Management Entity (MME).

8. A method of wireless communication, comprising:
   generating, by a first network entity, a mapped Evolved Packet System (EPS) security context associated with a request for an intersystem change of a user equipment (UE) from a wireless system to an EPS, wherein the mapped EPS security context includes security parameters created based on a security context used for the wireless system, the security parameters enabling security-related communications between the UE and a second network entity;
   setting an uplink (UL) non-access stratum (NAS) COUNT value for the mapped EPS security context to a current UL NAS COUNT value of the security context;
   setting a downlink (DL) NAS COUNT value for the mapped EPS security context to a current DL NAS COUNT value of the security context; and
   transmitting, by the first network entity, the mapped EPS security context with the DL NAS COUNT value to the second network entity.

9. The method of claim 8, wherein the intersystem change of the UE from the wireless system to the EPS corresponds to a handover procedure of the UE from the wireless system to the EPS.

10. The method of claim 9, further comprising:
receiving, at the first network entity, a handover required message in response to an initiation of the handover procedure of the UE from the wireless system to the EPS, the handover required message including one or more security capabilities of the UE; and
wherein generating the mapped EPS security context further comprises generating the mapped EPS security context based on the handover required message.

11. The method of claim 8, wherein the intersystem change of the UE from the wireless system to the EPS corresponds to an idle mode mobility of the UE from the wireless system to the EPS.

12. The method of claim 11, further comprising:
receiving, by the first network entity, a Tracking Area Update (TAU) Request forwarded from the second network entity, the TAU Request being transmitted by the UE and including a previous UL NAS COUNT value of the security context; and
wherein generating the mapped EPS security context further comprises generating the mapped EPS security context based on receiving the TAU Request.

13. The method of claim 8, wherein the first network entity corresponds to an Access and Mobility Management Function (AMF).

14. The method of claim 8, wherein the second network entity corresponds to a Mobility Management Entity (MME).

15. A user equipment (UE) for wireless communication, comprising:
a transceiver;
a memory configured to store instructions; and
one or more processors communicatively coupled with the transceiver and the memory, wherein the one or more processors are configured to execute the instructions to:
generating a mapped Evolved Packet System (EPS) security context associated with an intersystem change of the UE from a wireless system to an EPS, wherein the mapped EPS security context comprises security parameters created based a security context used for the wireless system, the security parameters enabling security-related communications between the UE and a network entity;
setting an uplink (UL) non-access stratum (NAS) COUNT value for the mapped EPS security context to a current UL NAS COUNT value of the security context;
setting a downlink (DL) NAS COUNT value for the mapped EPS security context to a current DL NAS COUNT value of the security context; and
transmitting a NAS message to the network entity, the NAS message including the UL NAS COUNT value of the mapped EPS security context.

16. The UE of claim 15, wherein the intersystem change of the UE from the system to the EPS corresponds to a handover procedure of the UE from the wireless system to the EPS.

17. The UE of claim 16, wherein the one or more processors are further configured to execute the instructions to:
receive a handover command in response to the handover procedure of the UE from the wireless system to the EPS, the handover command including the security parameters for generating a mapped EPS security context; and
wherein generating the mapped EPS security context further comprises generating the mapped EPS security context based on the handover command.

18. The UE of claim 17, wherein to receive the handover command, the one or more processors are configured to execute the instructions to receive the handover command from an Access Mobility and Management Function (AMF).

19. The UE of claim 15, wherein the intersystem change of the UE from the wireless system to the EPS corresponds to an idle mode mobility of the UE from the wireless system to the EPS.

20. A network entity for wireless communication, comprising:
a transceiver;
a memory configured to store instructions; and
one or more processors communicatively coupled with the transceiver and the memory, wherein the one or more processors are configured to execute the instructions to:
generate a mapped Evolved Packet System (EPS) security context associated with a request for an intersystem change of a user equipment (UE) from a wireless system to an EPS, wherein the mapped EPS security context includes security parameters created based a security context used for the wireless system, the security parameters enabling security-related communications between the UE and a second network entity;
set an uplink (UL) non-access stratum (NAS) COUNT value for the mapped EPS security context to a current UL NAS COUNT value of the security context;
set a downlink (DL) NAS COUNT value for the mapped EPS security context to a current DL NAS COUNT value of the security context;
determine a downlink (DL) non-access stratum (NAS) COUNT value and an uplink (UL) NAS COUNT value for the mapped EPS security context; and
transmit the mapped EPS security context with the DL NAS COUNT value to the second network entity.

21. The network entity of claim 20, wherein the intersystem change of the UE from the wireless system to the EPS corresponds to a handover procedure of the UE from the wireless system to the EPS.

22. The network entity of claim 20, wherein the intersystem change of the UE from the wireless system to the EPS corresponds to an idle mode mobility of the UE from the wireless system to the EPS.

23. The network entity of claim 22, wherein the one or more processors are further configured to execute the instructions to: transmitting, by the UE, a Tracking Area Update (TAU) Request to the network entity, the TAU Request including the UL NAS COUNT value of the security context; and wherein generating the mapped EPS security context further comprises generating the mapped EPS security context subsequent to transmitting the TAU Request.

24. The network entity of claim 22, wherein the one or more processors are further configured to execute the instructions to:
receiving a Tracking Area Update (TAU) Request forwarded from the second network entity, the TAU Request being transmitted by the UE and including a previous UL NAS COUNT value of the security context; and wherein generating the mapped EPS security context further comprises generating the mapped EPS security context based on receiving the TAU Request.

25. The network entity of claim 22, wherein the network entity corresponds to a Mobility Management Entity (MME).

26. A non-transitory computer-readable device having instructions thereon that, when executed by at least one computing device, causes the at least one computing device to perform operations comprising:

generating, by a user equipment (UE), a mapped Evolved Packet System (EPS) security context associated with an intersystem change of the UE from a wireless system to an EPS, wherein the mapped EPS security context comprises security parameters created based on a security context used for the wireless system, the security parameters enabling security-related communications between the UE and a network entity;

setting an uplink (UL) non-access stratum (NAS) COUNT value for the mapped EPS security context to a current UL NAS COUNT value of the security context;

setting a downlink (DL) NAS COUNT value for the mapped EPS security context to a current DL NAS COUNT value of the security context; and transmitting, by the UE, a NAS message to the network entity, the NAS message including the UL NAS COUNT value of the mapped EPS security context.

27. The non-transitory computer-readable device of claim 26, wherein the intersystem change of the UE from the wireless system to the EPS corresponds to a handover procedure of the UE from the wireless system to the EPS.

28. The non-transitory computer-readable device of claim 27, further comprising:

receiving, at the UE, a handover command in response to the handover procedure of the UE from the wireless system to the EPS, the handover command including the security parameters for generating a mapped EPS security context; and wherein generating the mapped EPS security context further comprises generating the mapped EPS security context based on the handover command.

29. The non-transitory computer-readable device of claim 28, wherein receiving the handover command further comprises receiving the handover command from an Access Mobility and Management Function (AMF).

30. The non-transitory computer-readable device of claim 26, wherein the intersystem change of the UE from the wireless system to the EPS corresponds to an idle mode mobility of the UE from the wireless system to the EPS.

31. The non-transitory computer-readable device of claim 30, further comprising:

transmitting, by the UE, a Tracking Area Update (TAU) Request to the network entity, the TAU Request including the UL NAS COUNT value of the security context; and wherein generating the mapped EPS security context further comprises generating the mapped EPS security context subsequent to transmitting the TAU Request.

32. The non-transitory computer-readable device of claim 26, wherein the network entity corresponds to a Mobility Management Entity (MME).

33. A non-transitory computer-readable device having instructions thereon that, when executed by at least one computing device, causes the at least one computing device to perform operations comprising:

generating, by a first network entity, a mapped Evolved Packet System (EPS) security context associated with a request for an intersystem change of a user equipment (UE) from a wireless system to an EPS, wherein the mapped EPS security context includes security parameters created based on a security context used for the wireless system, the security parameters enabling security-related communications between the UE and a second network entity;

setting an uplink (UL) non-access stratum (NAS) COUNT value for the mapped EPS security context to a current UL NAS COUNT value of the security context;

setting a downlink (DL) NAS COUNT value for the mapped EPS security context to a current DL NAS COUNT value of the security context; and transmitting, by the first network entity, the mapped EPS security context with the DL NAS COUNT value to the second network entity.

34. The non-transitory computer-readable device of claim 33, wherein the intersystem change of the UE from the wireless system to the EPS corresponds to a handover procedure of the UE from the wireless system to the EPS.

35. The non-transitory computer-readable device of claim 34, further comprising:

receiving, at the first network entity, a handover required message in response to an initiation of the handover procedure of the UE from the wireless system to the EPS, the handover required message including one or more security capabilities of the UE; and wherein generating the mapped EPS security context further comprises generating the mapped EPS security context based on the handover required message.

36. The non-transitory computer-readable device of claim 33, wherein the intersystem change of the UE from the wireless system to the EPS corresponds to an idle mode mobility of the UE from the wireless system to the EPS.

37. The non-transitory computer-readable device of claim 36, further comprising:

receiving, by the first network entity, a Tracking Area Update (TAU) Request forwarded from the second network entity, the TAU Request being transmitted by the UE and including a previous UL NAS COUNT value of the security context; and wherein generating the mapped EPS security context further comprises generating the mapped EPS security context based on receiving the TAU Request.

38. The non-transitory computer-readable device of claim 33, wherein the first network entity corresponds to an Access and Mobility Management Function (AMF).

39. The non-transitory computer-readable device of claim 33, wherein the second network entity corresponds to a Mobility Management Entity (MME).

40. A user equipment (UE) for wireless communication, comprising:

means for generating a mapped Evolved Packet System (EPS) security context associated with an intersystem change of the UE from a wireless system to an EPS, wherein the mapped EPS security context comprises security parameters created based a security context used for the wireless system, the security parameters enabling security-related communications between the UE and a network entity;

means for setting an uplink (UL) non-access stratum (NAS) COUNT value for the mapped EPS security context to a current UL NAS COUNT value of the security context;

means for setting a downlink (DL) NAS COUNT value for the mapped EPS security context to a current DL NAS COUNT value of the security context; and means for transmitting a NAS message to the network entity, the NAS message including the UL NAS COUNT value of the mapped EPS security context.

41. The UE of claim 40, wherein the intersystem change of the UE from the system to the EPS corresponds to a handover procedure of the UE from the wireless system to the EPS.

42. The UE of claim 40, wherein the intersystem change of the UE from the wireless system to the EPS corresponds to an idle mode mobility of the UE from the wireless system to the EPS.

43. The UE of claim 40, further comprising:
means for receiving a handover command in response to the handover procedure of the UE from the wireless system to the EPS, the handover command including the security parameters for generating a mapped EPS security context; and
wherein the means for generating the mapped EPS security context comprises means for generating the mapped EPS security context based on the handover command.

44. The UE of claim 43, wherein the means for receiving the handover command further comprises means for receiving the handover command from an Access Mobility and Management Function (AMF).

45. A network entity for wireless communication, comprising:
means for generating a mapped Evolved Packet System (EPS) security context associated with a request for an intersystem change of a user equipment (UE) from a wireless system to an EPS, wherein the mapped EPS security context includes security parameters created based a security context used for the wireless system, the security parameters enabling security-related communications between the UE and a second network entity;

means for setting an uplink (UL) non-access stratum (NAS) COUNT value for the mapped EPS security context to a current UL NAS COUNT value of the security context;

means for setting a downlink (DL) NAS COUNT value for the mapped EPS security context to a current DL NAS COUNT value of the security context;

means for determining a downlink (DL) non-access stratum (NAS) COUNT value and an uplink (UL) NAS COUNT value for the mapped EPS security context; and means for transmitting the mapped EPS security context with the DL NAS COUNT value to the second network entity.

46. The network entity of claim 45, wherein the intersystem change of the UE from the wireless system to the EPS corresponds to a handover procedure of the UE from the wireless system to the EPS.

47. The network entity of claim 45, wherein the intersystem change of the UE from the wireless system to the EPS corresponds to an idle mode mobility of the UE from the wireless system to the EPS.

48. The network entity of claim 47, further comprising means for transmitting, by the UE, a Tracking Area Update (TAU) Request to the network entity, the TAU Request including the UL NAS COUNT value of the security context; and wherein the means for generating the mapped EPS security context comprises means for generating the mapped EPS security context subsequent to transmitting the TAU Request.

49. The network entity of claim 47, further comprising:
means for receiving a Tracking Area Update (TAU) Request forwarded from the second network entity, the TAU Request being transmitted by the UE and including a previous UL NAS COUNT value of the security context; and
wherein the means for generating the mapped EPS security context comprises means for generating the mapped EPS security context based on receiving the TAU Request.

50. The network entity of claim 47, wherein the network entity corresponds to a Mobility Management Entity (MME).

* * * * *